Figure 1:
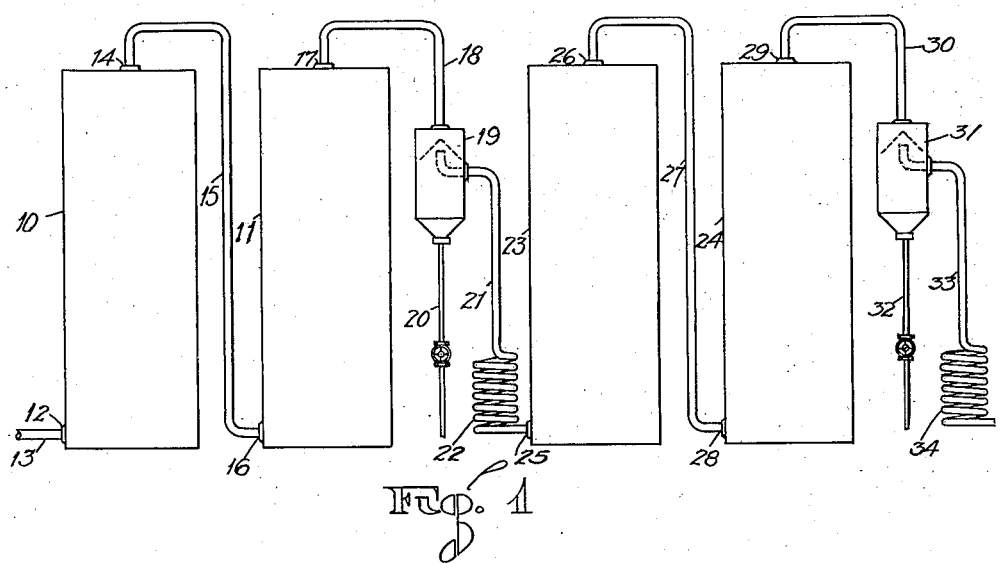

Aug. 23, 1932.   M. J. TRUMBLE   1,873,910

PROCESS OF TREATING CARBONACEOUS MATERIAL

Filed Oct. 13, 1926

INVENTOR
MILON J. TRUMBLE
BY
ATTORNEY

Patented Aug. 23, 1932

1,873,910

UNITED STATES PATENT OFFICE

MILON J. TRUMBLE, OF ALHAMBRA, CALIFORNIA, ASSIGNOR, BY MESNE ASSIGNMENTS, TO COALS AND CHEMICALS LTD., A CORPORATION OF NEVADA

PROCESS OF TREATING CARBONACEOUS MATERIAL

Application filed October 13, 1926. Serial No. 141,339.

The hereinafter described invention relates to the treatment of carbonaceous substances of a carbonizable nature such as coal, peat, shale or the like, in which superheated steam is utilized as the heat medium for carbonizing the substance or voiding the same, as charged in a series of retorts, of its volatile content, while converting the substance into a residual of value as fuel.

Among the objects of my invention is the utilization of the superheated steam employed in such a manner that the temperature drop of the steam as initially introduced in passing through a plurality of retorts which I may term a battery will, while doing the work of voiding the charges of material therein of their volatile content, be maintained at such a point in the last of the said retorts as to permit only the condensation of certain of the heavy residuums, pitch or tarry matter, out of the oil vapors liberated from the charge and so that the steam and oil vapors leaving the last of the plurality of the said retorts will upon being resuperheated and utilized in a second battery or plurality of retorts be ridded of residuum or tarry matter as would plug or foul the retorts of such battery by its deposition therein and preventing the passage of the steam and oil vapors through the charges of the second battery of retorts in voiding them of their volatile content as is advocated in the new and novel process of my invention in effecting the expeditious and economical retorting of carbonaceous material.

Another object of my invention is to employ a series of retorts which may comprise a number of batteries, the number of which per battery will depend upon the character of the material to be retorted, and to dephlegmate certain of the heavy tarry matter, residuum or the like from the steam and oil vapors liberated out of the last of the retorts of the battery so that these vapors may be superheated and brought up to substantially the initial temperature as introduced into the first retort of the battery, thereby preventing the impregnation of the superheater elements with matter that would form a deposition of carbon or other objectionable coating, and which would stop the transfer of heat as well as cause frequent shutdowns for cleaning and renewal of parts.

A further object of my invention contemplates the saving of the latent heat of the steam I employ for retorting the carbonaceous material by not permitting an early condensation of the steam and only a partial condensation of the oil vapors as liberated from the charge, carrying on the application of the steam and hot vapors to successive charges of material after dephlegmating and superheating respectively the steam and part of the oil vapors out of one battery of retorts of two or more units per battery and introducing the vapors so treated into a second battery of retorts and again dephlegmating a part of the oil vapors and superheating the steam and remaining vapors as withdrawn from the last of the units of the second battery and introducing them into a third battery and so on through as many batteries of retorts as may be deemed necessary in economically treating a given carbonaceous material and in prolonging the condensation of the total volume of steam and oil vapors and the giving up of the latent heat of same.

In order to comprehend my invention reference is made to the illustrative embodiment in diagrammatical form and shown in elevation, as set out in Fig. 1 hereof, in which a plurality of retorts or chambers into which the carbonaceous material for treatment is charged and discharged in well-known manner, is denoted by numerals 10 and 11. In this instance two retorts only are shown illustrative of the plurality of units forming the first battery of retorts. Superheated steam from a source of supply is brought into the first retort 10, at 12, through pipe 13 and passes through the charge where it is withdrawn at 14 with the volatile constituents of the charge through pipe 15, which latter is carried to the bottom of the retort 11 entering the same at 16. The steam and hot vapors from retort 10 pass through retort 11, and the products of distillation or volatile constituents arising from this retort are withdrawn at 17, through pipe 18 into dephlegmator or trap 19, where heavy condensible oils or residuum of high boiling point such as the pitches or tars are collected and removed from the dephlegmator 19, through pipe 20, for refining or other useful purposes. The steam and vapors as freed of their heavy oil fractions are carried out of dephlemagtor 19, through pipe 21, into superheater 22, where the steam and vapors are brought up to substantially the initial temperature at which they entered the retort 10, namely, a about 1200° F. The temperature of the steam and hot vapors leaving the last retort of the battery usually approximates 550° F., but will vary somewhat dependent upon the character of the carbonaceous material retorted. I have found in practice, generally speaking, that the heat of steam above 700° F. is most efficient in voiding the charge of its volatile content. The steam and hot vapors passing through superheater 22, enter the first retort 23, of a second plurality or battery of retorts 23 and 24 at 25, and pass up through the carbonaceous material as charged in the retort freely and without hindrance of a heavy deposition of heavy residuum or tarry matter that would without the dephlegmation of the same, seal or plug the bottom portion of the charge and prevent the expeditious voiding of its volatile content. The steam and hot vapors are led out of retort 23 at 26 through pipe 27, into the bottom of retort 24, at 28 and passing therethrough are led out of the top of retort 24, at 29 through pipe 30, into dephlegmator 31, where the heavy offensive tary constituents which would build up in the superheater and foul the same are again removed as in the first battery of retorts; through pipe 32, the steam and volatile constituents passing out of the dephlegmator 31 through the pipe 33 into the superheater 34 where they are reheated again and made utilizable for a further plurality of retorts if same are required in carrying out the process of my invention.

In this manner I carry on my process utilizing as many sets of retorts as may be required, dephlegmating and superheating the steam and hot vapors between each set before introducing them as the heat medium in the succeeding set and consequently making a final residual out of the carbonaceous material, as when coal is treated, for example, that is substantially uniform in all retorts and which can be freely withdrawn from the retorts through elimination of the gummy tarry matter that otherwise causes the charge to adhere to the retort walls causing expensive removal of same.

Again I have found by my method of dephlegmation of the heavy residuum from the steam and oil vapors that I can now make a superheater fit for continuous use in a practical manner and so that by my process the utilization of the steam and hot vapors through a series of retorts charged with carbonaceous material can now be carried on with a materially higher rate of thermal efficiency through prolonging the giving up of the latent heat through early condensation of the oil and consequently the steam vapors with them.

Finally the vapors leaving the last retort are condensed and the oils therefrom recovered in the usual and well known manner. The fixed gases of the last retorting are utilized for power purposes and the residual of the retort is utilized as fuel.

What I claim is:

1. The process of treating solid carbonizable material by the direct contact of superheated steam with said material in a plurality of intercommunicating chambers, which includes: introducing superheated steam into the first of said chambers at a temperature of substantially 1100° F.–1200° F.; passing said steam through a battery of said intercommunicating chambers of such magnitude that the vapors issuing from the last chamber in the battery are at a temperature of substantially 550° F., so conserving the latent heat of the steam, dephlegmating the vapors to condense the heavy fractions, then superheating the vapors issuing from the dephlegmator to a temperature of substantially 1100° F.–1200° F., and introducing the superheated vapors into the first of another series of intercommunicating chambers.

2. The process of treating solid carbonizable material by the direct contact of superheated steam with said material in a plurality of intercommunicating chambers, which includes: introducing superheated steam into the first of said chambers at a temperature of substantially 1100° F.–1200° F.; passing said steam through a battery of said intercommunicating chambers of such magnitude that the vapors issuing from the last chamber in the battery are at a temperature of substantially 550° F., so conserving the latent heat of the steam, dephlegmating the vapors to condense the heavy fractions, then superheating the vapors issuing from the dephlegmator to a temperature of substantially 1100° F.–1200° F., and introducing the superheated vapors into the first of another series of intercommunicating chambers, the temperature of said dephlegmation being regulated so as to remove the heavy vapors which would crack in the superheater and at the same time conserve the latent heat in the steam.

3. The process of treating solid carbonizable material which comprises: placing said material into each of a series of intercommunicating chambers; introducing steam, superheated to a temperature sufficient to distill volatile constituents from said material, into direct contact with the material in the first of said chambers; passing said steam through the material in a battery of said chambers; dephlegmating the steam and volatile distillation products issuing from the last retort in said battery to condense higher fractions therefrom; superheating the steam and uncondensed fractions; and introducing the superheated mixture into another similar battery of chambers, the conditions in said retorts and said dephlegmator being regulated so as to prevent the condensation of said steam and thereby conserve the latent heat therein.

In testimony whereof I have hereunto set my hand at Los Angeles, California, this 4th day of October, 1926.

MILON J. TRUMBLE.